United States Patent [19]

Miyawaki et al.

[11] Patent Number: 4,724,450
[45] Date of Patent: Feb. 9, 1988

[54] MOTORIZED CAMERA

[75] Inventors: Makoto Miyawaki; Yukio Ogawa, both of Kanagawa; Takanori Kodaira; Michio Hirohata, both of Tokyo, all of Japan

[73] Assignee: Canon Kabushiki Kaisha, Japan

[21] Appl. No.: 45,230

[22] Filed: Apr. 28, 1987

Related U.S. Application Data

[63] Continuation of Ser. No. 917,234, Oct. 7, 1986, abandoned, which is a continuation of Ser. No. 716,330, Mar. 26, 1985, abandoned.

[30] Foreign Application Priority Data

Mar. 29, 1984 [JP] Japan .................. 59-45358[U]

[51] Int. Cl.⁴ ..................... G03B 1/00; G03B 3/10
[52] U.S. Cl. ..................... 354/173.1; 354/195.1; 354/214
[58] Field of Search ................ 354/400, 412, 149.1, 354/170, 171, 173.1, 173.11, 212, 214, 195.1, 195.12

[56] References Cited

U.S. PATENT DOCUMENTS

| | | | |
|---|---|---|---|
| 3,735,683 | 5/1973 | Umeda | 354/173.1 X |
| 4,258,998 | 3/1981 | Lermann et al. | 354/173.1 |
| 4,294,527 | 10/1981 | Hashimoto et al. | 354/173.1 X |
| 4,350,423 | 9/1982 | Engelsmann et al. | 354/173.1 |
| 4,392,730 | 7/1983 | Iwashita et al. | 354/173.1 |
| 4,405,221 | 9/1983 | Yoshida et al. | 354/173.1 |
| 4,601,563 | 7/1986 | Miyawaki et al. | 354/173.1 X |

FOREIGN PATENT DOCUMENTS 145926 8/1983 Japan .

Primary Examiner—W. B. Perkey
Attorney, Agent, or Firm—Toren, McGeady & Associates

[57] ABSTRACT

A motorized camera having a gear train between an electric reversible motor and a film rewind fork with a mechanism for transferring the driving torque from an intermediate gear of the train to move a member having function other than film transportation as the gear is out of mesh with the next one, wherein a mechanism is provided between the last gear of the train and the rewind fork so that only when the last gear has rotated by a prescribed angular distance, the fork starts to engage the supply spool of the film cartridge to rewind the film.

33 Claims, 5 Drawing Figures

MOTORIZED CAMERA

This is a continuation of application Ser. No. 917,234, filed Oct. 7, 1986, now abandoned, which is a continuation of application Ser. No. 716,330, filed Mar. 26, 1985, now abandoned.

BACKGROUND OF THE INVENTION

1. Field of the Invention

This invention relates to a motorized camera in which the film winding and rewinding motor also serves as a drive source for moving the photographic lens between two focal length positions, popping up a strobe or changing lhe position of a member performing other function.

2. Description of the Prior Art

It has been known in the art to provide a type of motorized camera in which the driving torque transmission gear train between the electric motor and the film takeup spool or the film rewind fork is arranged to be manually broken at an intermediate gear and then to transfer the motion of the motor to, for example, an operating mechanism for the lens barrel or the strobe.

As, in such a camera, the second half of the gear train beginning with that gear with which the intermediate or changeover gear is brought into and taken out of meshing engagement is in drive connection with the film rewind fork, therefore, when the changeover gear returns to establish the complete gear train, it often happens that the film is more or less moved backward. An attempt has been made to avoid this by making the last or fork gear releasably locked. But, because the next gear to the changeover gear is restrained from rotation, a smooth switching operation cannot be carried out.

SUMMARY OF THE INVENTION

An object of the invention is to eliminate the above-described drawback, and to enable the rewind fork to initiate a rewinding operation after the rewind fork gear has rotated by a prescribed angular distance, whereby the adverse influence of the re-engagement of the changeover gear on the film is removed.

Other objects of the invention will become apparent from the following description of an embodiment thereof.

DETAILED DESCRIPTION OF THE PREFERRED EMBODIMENT

The present invention will next be described in connection with an embodiment thereof applied to a camera of the type in which the film winding and rewinding motor also serves to axially move the focal length changeable lens barrel forward or backward.

Figure 1:
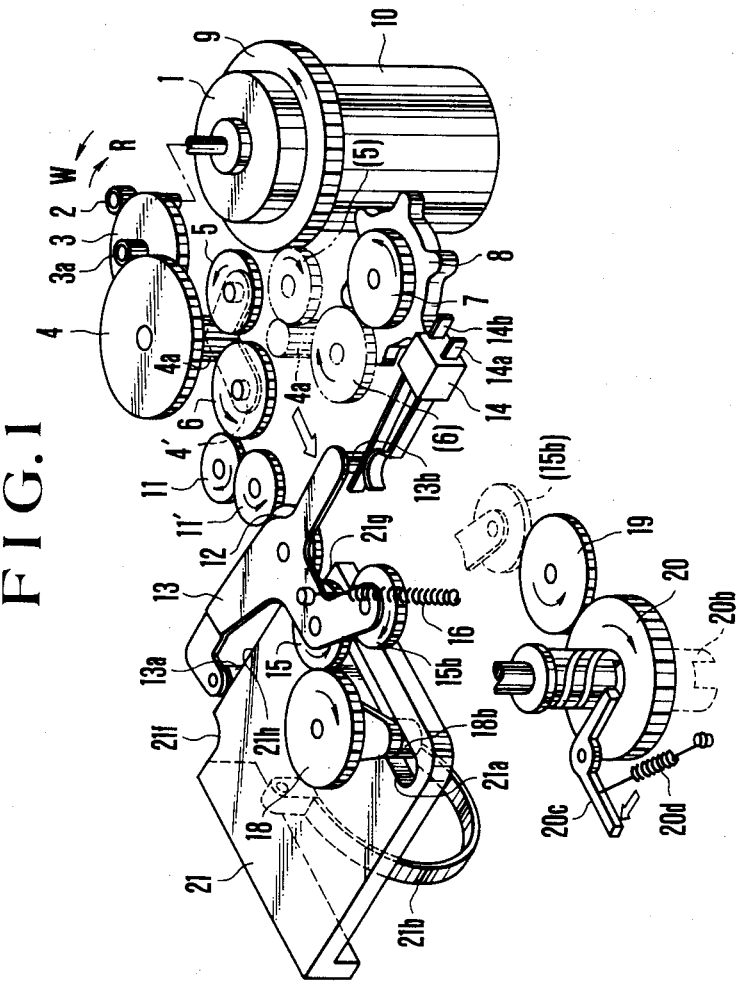
FIG. 1 is a perspective view of an embodiment of a motorized camera according to the present invention.

In FIG. 1, a reversible motor 1 operating as a drive source for transporting a roll film between supply and takeup spools, charging a shutter and moving the lens barrel, is mounted in the interior of the takeup spool 10. A pinion 2 is mounted on the output shaft of the motor 1. Gears 3, 3a, 4 and 4a form a speed reduction gear train for the motor 1.

Planetary gears 5 and 6 are rotatably mounted with some frictional force on a lever 4' of letter "L" shape which is pivotally mounted on the common shaft of the gear 4 and pinion 4a, and mesh with the pinion 4a to revolve round the pinion 4a as the lever 4' turns. When the motor 1 rotates in a direction to wind up the film, or the direction indicated by arrow W, the gear 5 is brought into engagement with a gear 9 of the spool 10, and the gear 6 into enegegement with a gear 7 of a sprocket 8. When the motor 1 rotates in the reversed direction (indicated by arrow R) to rewind the film, the gear 6 is brought into enegegement with an idler gear 11, and the gear 5 is left taken out of engagement with any gear. In FIG. 1, for the former case, their positions are illustrated by phantom lines with their reference numerals in parentheses, and for the latter case, their positions are illustrated by solid lines with their reference numerals not in parentheses.

Gears 11, 11', 12, 15, 15b, and 19 are normally in mesh successively to form a train until a fork gear 20 for film rewinding.

A manually operable lever 13 is pivotally mounted on the common shaft of the gear 12, and rotatably carries the gears 15 and 15b. When the lever 13 is turned in a clockwise direction manually, the gear 15b is moved from a position (shown by dashed lines and denoted by a reference character in parentheses) being taken out of engagement with the gear 19, and the gear 15 is brought into engagement with a Tele/Wide gear 18 for moving the barrel between the telephoto and wide angle ends. In this position, the gear 15b has no function.

The Tele/Wide gear 18 has an eccentric pin 18b extending into a slightly loosely fitted slot 21a of a barrel drive plate 21, so that rotation of the Tele/Wide gear 18 is transmitted through the pin 18b-and-slot 21a connection to axial movement of a barrel 21b carried on the plate 21.

A switch 14 for controlling the supply of current flowing to the motor 1 in the reversed direction R is arranged adjacent an actuator 13b on an arm end of the lever 13 to be closed when the lever 13 turns in the clockwise direction to the position where the gear 15 meshes with the Tele/Wide gear 18, as its contacts 14a and 14b close.

To sustain the lever 13 in the clockwisemost position without the help of the operator's hand after the motor 1 has started moving the barrel carrier plate 21 axially forward or backward, there is a roller 13a arranged on the lever 13 to retract from the path of either a front cam 21f (corresponding to the wide angle end of movement of the barrel 21b) or a rear cam 21g (corresponding to the telephoto end of the movement) and then to ride on the side edge 21h of the carrier plate 21. This allows for axial movement of the barrel carrier 21, since the roller 13a has another function of setting the carrier 21 in the two discrete focal length positions separately.

A spring 16 urges the lever 13 in a counterclockwise direction so that as soon as the barrel 21b reaches the frontmost or the rearmost position, the roller 13a is rapidly dropped in the Wide cam 21f or the Tele cam 21g, turning the lever 13 in the counterclockwise direction, whereby the gear 15 is taken out of mesh with the Tele/Wide gear 18 as instantly as possible, and the switch 14 is opened.

A film rewind fork 20b, receptive of the driving torque from the motor 1 through the gear train 11-11'-12-15-15b-19-20 that is established always except for the time of operation of the lever 13, rotates a spool in the film cartridge on which the exposed film is wound as it is fed from the takeup spool 10.

Figure 3:
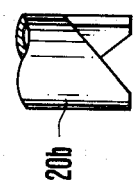
FIG. 3 is a fragmentary elevational view of the lower end of the fork.
Figure 2:
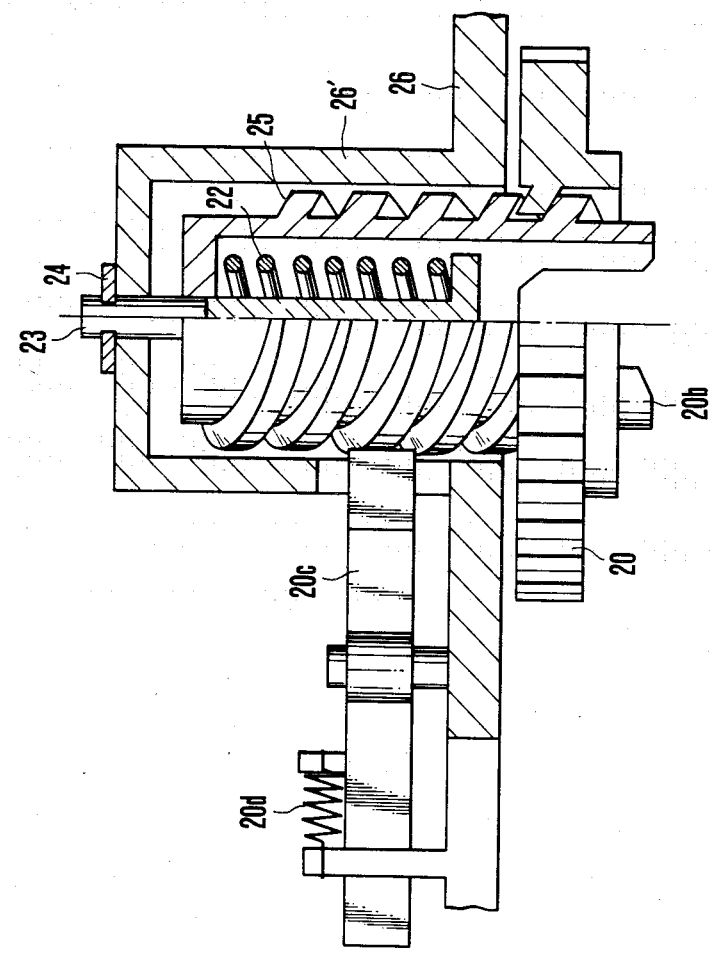
FIG. 2 is a partly side elevational partly sectional view of an operating mechanism for the fork of FIG. 1.

Referring now also to FIG. 2, there is shown the construction and arrangement of the fork 20b and its associated parts. The fork 20b is provided with a helix-threaded portion 25 movably fitted in the gear 20. This helix-threaded portion 25 can be contained in a tubular casing 26' formed in the camera housing 26. A pressor lever 20c is pivotally mounted on the camera housing 26 and is urged by a spring 20d to abut with its one arm against the surface of the helix-threaded portion 25 with a radial frictional force thereon. But when a back cover (not shown) of the camera housing 26 is opened, the lever 20c is turned against the force of the spring 20d whereby the radial frictional force is no longer exerted on the helix-threaded portion 25. A coil spring 22 urges, the fork 20b upward. With the back cover closed, when it is desired to rewind the film, the reverse motion of the motor 1 is started. Because of the presence of the pressure on the helix-threaded portion 25, as it is driven to rotate by the gear 20, the fork 20b moves downward from the uppermost position illustrated in FIG. 2, while compressing the spring 22. After a certain time has passed, the fork 20b comes to engage with the supply spool in the film cartridge. From this time onward, the fork 20b, while being stopped from further downward movement, rotates the supply spool to rewind the film thereon against the radial frictional force of the lever 20c. It should be noted that facilitate a smooth coupling of the fork 20b with the supply spool hub as it moves downward, it is preferred to form the lower end of the fork 20b to a slant shape as shown in FIG. 3. As the rewinding is completed, when the back cover is opened, the load by the pressor lever 20c and the tensioned film leader is removed, permitting the coil spring 22 to take action on the fork 20b. Therefore, while rotating according to the helix, the fork 20b moves upward to the initial position of FIG. 2. In FIG. 2, 23 is a supporting member for the spring 22, and 24 is a retainer ring of letter "C" shape.

In describing the operation of the camera, although FIG. 1 illustrates the barrel 21b at an intermediate point during focal length changing movement, first there will be explained the normal operation without the accompanyment of the operation of the barrel.

The lever 13 is normally held stationary in the counterclockwise turned position by the spring 16. Therefore, the roller 13a in either of the Wide and Tele cams 21f and 21g allows the gear 15 to disengage from the Tele/Wide gear 18, the gear 15b to engage with the gear 19, and the switch 14 to open.

When in the film winding mode, the motor 1 rotates in the counterclockwise direction indicated by arrow W in FIG. 1. Motion of the motor 1 is transmitted both through the train of gears 2-3-3a-4-4a-(5)-9 to the spool 10 and through the train of gears 2-3-3a-4-4a-(6)-7 to the sprocket 8, whereby the part of the film which is advanced by the sprocket 8 is taken up on the spool 10. At this time, the motion is not transmitted to the gear 11 and those that follow.

When in the film rewinding mode, a switch (not shown) other than the switch 14 is operated to rotate the motor 1 in the clockwise direction indicated by arrow R. Rotation of the gear train 2-3-3a-4-4a causes, as has been described above, disengagement of the gear 5 from the spool gear 9 to leave the spool 10 freely rotatable, and disengagement of the gear 6 from the sprocket gear 7 to leave the sprocket 8 freely rotatably which is followed by engagement of the gear 6 with the idler gear 11. Therefore, motion of the motor 1 is transmitted to the gear 11 and therefrom through the gear train 11'-12-15-(15a)-19 to the gear 20. When the angular distance through which the gear 20 has rotated reaches a prescribed value, a drive connection of the fork 20b with the hub of the supply spool in the cartridge is established. Then, the driving torque is transmitted from the gear 20 to the fork 20b. Thus, the film is rewound on the supply spool. After the rewinding has been completed, when the back cover is opened, the pressor lever 20c is moved away from the frictional engagement with the helix 25. Then, the fork 20b returns to the initial position while being rotated as the gear 20 is held stationary.

Next, there will be explained the torque tranferring operation to the operating mechanism for the lens barrel. The operator needs to turn the lever 13 in the clockwise direction manually against the spring 16. Then, the gear 15b is disengaged from the gear 19, whereby the torque transmission to the fork 20b is off. At the same time, the gear 15 moves to engage with the Tele/Wide gear 18, and the rotor 13a (assumed to have lain in the Tele cam 21g) comes out from the tele cam 21g. Then, the actuator 13b moves the contact 14b of the switch 14 to engage with the contact 14a thereof, and the motor 1 starts to rotate in the reverse direction. Therefore, the same first half of the gear train as that when in the rewind mode, i.e., the gear train 2-3-3a-4-4a-6-11-11', is established so that after rotation of the motor 1 has been transmitted to the gear 15, it is not further directed toward the fork 20b, but transferred to the Tele/Wide gear 18. Therefore, the eccentric pin 18b pushes the rear side edge of the slot 21a, and the lens barrel carrier 21 starts to move rearward. After the start of movement of the carrier 21, when the cam recess 21g moves away from the roller 13a, the operator may remove his finger from the depression of the lever 13 without causing counterclockwise movement of the lever 13, since the driving torque transmission from the motor 1 to the Tele/Wide gear 18 is maintained operative as shown in FIG. 1.

Then, when the pin 18b arrives at the rearmost position, and, therefore, the barrel 21b reaches the terminal end (wide angle end) of axial movement thereof, the Wide cam 21f enters the path of movement of the roller 13a. Therefore, the lever 13 is turned in th.e counterclockwise direction by the spring 16, whereby the gear 15 is taken out of engagement with the Tele/Wide gear 18, and the gear 15b which has so far been idle is brought into engagement with the gear 19. At the same time, the switch 14 is opened, and the rotation of motor 1 stops. Thus, the focal length changing operation is terminated, under the condition that the driving torque transmission to the rewind fork is reestablished.

Next, when it is desired to move the barrel 21b again to the front position (telephoto setting), the lever 13 has again to be turned in the clockwise direction manually. Then, a similar subsequent operation to the above takes place. But at this time the eccentric pin 18b pushes the front side edge of the slot 21a. Therefore, the slide plate 21 moves forward. When the eccentric pin 18b arrives at the frontmost point, the cycle of opration of the barrel is terminated.

After that, each time the lever 13 is manually turned in the clockwise direction, automatic settings of the barrel to the wide angle and telephoto positions can alternatively result.

It should be recognized here that for a certain time from the termination of the returning operation of the gear 15b that follows the termination of each cycle of operation of the barrel, the gear 15b continues rotating. This rotation is given to the gear 19, and therefrom transmitted to the last gear 20. But, since the provision for deferring the transmission of the motion of the last gear 20 to the fork 20b has been made at the mechanism of FIG. 2, the film is prevented from moving backward. Another advantage of the mechanism of FIG. 2 is that loading and unloading of the film cartridge into and from the cartridge chamber is very easy, because the fork 20b is always retracted from the chamber when the back cover is open.

Although the foregoing embodiment has been described in connection with the automatic setting of the barrel for which the transfer of the driving torque of the motor is used, it is also possible to transfer the driving torque of the motor, for example, to close up and reset as macro lens, pop up and down a strobe, open and close a barrier for protection of the lens, or recycle the operation of any other member of different function therefrom.

Figure 4:
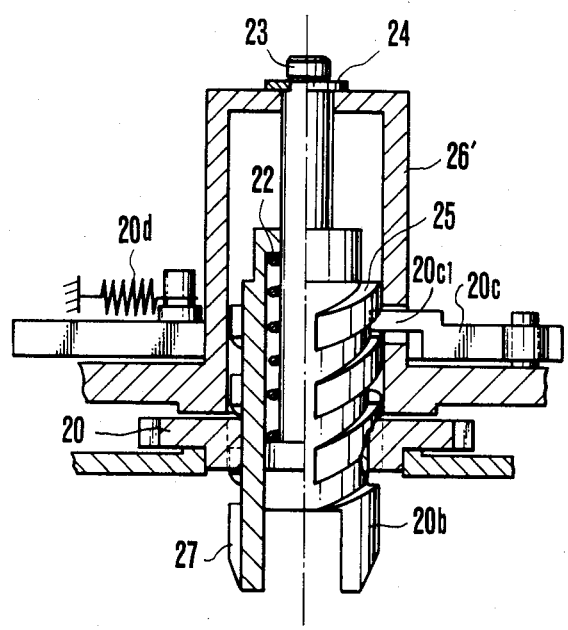
FIG. 4 is a similar sectional view of an modification of the operating mechanism of the fork shown in FIG. 2.
Figure 5:
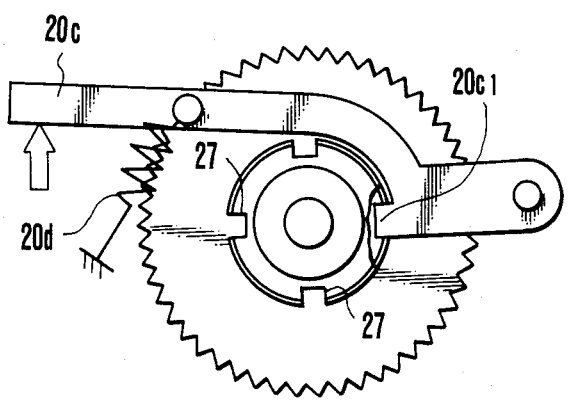
FIG. 5 is a plan view of the operating mechanism shown in FIG. 4, omitting the tubular casing.

In the foregoing embodiment, the pressor gear 20 is engaged with the helix-threaded portion 25 of the fork 20b, and the helix-threaded portion 25 is pressed by the pressor lever 20c. However, the present invention should not be limited to the above embodiment. The fork 20b may be further provided with four elongated grooves 27, as shown in FIGS. 4 and 5, with which the fork gear 20 is engaged, and the helix-threaded portion 25 of the fork 20b may be engaged with an engaging portion 20cl of the pressor lever 20c. In this modification, when the fork gear 20 rotates following the rewinding rotation of the motor 1, the fork 20b is also rotated, but the fork 20b descends because of the engagement of the engaging portion 20cl of the pressor lever 20c with the helix-threaded portion 25. While the back cover is opened, the pressor lever 20c rotates in the direction of the arrow, so that the engagement between the helix-threaded portion 25 and the engaging portion 20cl of the pressor lever 20c is liberated, whereby the fork 20b is raised by the force of the spring 22.

As has been described above, according to the present invention, the fork gear is made to rotate a certain angular distance before the fork starts to rotate the spool in the cartridge. Because the rewind gear train including the fork gear is normally disconnected from the spool of the cartridge, no adverse influence is imparted to the film when the motion of the film winding and rewinding motor is transferred from the automatic setting of a focal length changeable lens barrel or other member of different function to the rewind gear train, while still permitting a very smooth transferring operation to be carried out.

While specific embodiments of the invention have been shown and described in detail to illustrate the application of the inventive principles, it will be understood that the invention may be embodied otherwise without departing from such principles.

What is claimed is:
1. A camera comprising:
(A) first actuation means for transmitting a photosensitive material;
(B) second actuation means for performing an operation different from the transmission of the photosensitive material by the first actuation means;
(C) drive means for selectively dringing one of the first and second actuation means when connected therewith;
(D) manually operable changeover means for changing over a connection of said drive means from with said first actuation means to with said second actuation means;
(E) return means for normally connecting said drive means to said first actuation means and automatically returning said drive means which is connected to said second actuation means by said changeouver means to a state connected with said first actuation means; and
(F) protection means for preventing said first actuation means from being substantially operated by the inertia of the drive force of the drive means which has driven the second actuation means when the connection of the drive means is returned by the return means from said second actuation means to said first actuation means, said protection means permitting said first actuation means ot start the substantial operation after said first actuation means is driven a predetermined amount by said drive means.

2. A camera according to claim 1, wherein said second actuation means includes focal length changeover means for changing over the focal length of a photographic optical system.

3. A camera according to claim 1, wherein said first actuation means includes a film transferring member.

4. A camera according to claim 3, wherein said protection means includes moving means for moving the film transferring member to a position where the film can be transferred by the first actuation means when it is moved the predetermied amount by the drive means.

5. A camera according to claim 1, wherein said drive means includes an electric drive device.

6. A camera according to claim 1, wherein said return means includes an elastic member.

7. A camera comprising:
(A) first actuation means for transmitting a photosensitive material;
(B) second actuation means for performing an operation different from the transmission of the photosensitive material by the first actuation means;
(C) drive means for selectively driving one of said first and second actuation means when connected therewith;
(D) operation means for connecting said drive means connected with said first actuation means to said second actuation means;
(E) return means for automatically returning said drive means to a state connected to said first actuation means after it has transmitted a drive force to said second actuation menas; and
(F) protection means for protecting said first actuation means from the influence of inertia of the drive force transmitted to said second actuation means when said drive means is returned to a state connected to said first actuation means, said protection means preventing said first actuation means from substantially operating until the inertia of the drive force of said drive means transmitted to said second actuation means extinguishes even when the drive means is returned by the return means.

8. A camera according to claim 7, wherein said second actuation means includes focal length changeover means for changing over the focal length of a photographic optical system.

9. A camera according to claim 7, wherein said first actuation means includes transfer means for transferring the photosensitive material.

10. A camera according to claim 9, wherein said protection means includes moving means for moving the transfer member to a position where the photosensitive material can be transferred by the first actuation means when it is driven a predetermined amount by said drive means.

11. A camera according to claim 7, wherein said drive means includes an electric drive device.

12. A camera according to claim 7, wherein said return means includes an elastic member.

13. A camera comprising:
(A) first actuation means for transferring a photosensitive material;
(B) second actuation means for performing an operation different from the operation of the first actuation means;
(C) drive means for driving one of said first and second actuation means;
(D) changeover means for changing over said drive means automatically from driving said second actuation means to driving said first actuation means;
(E) protection means for protecting said first actuation means from adverse effect by the inertia of the drive force of said drive means which has driven said second actuation means when said drive means is changed over by the changeover means from a state of driving said second actuation means to a state of driving said first actuation means, said protection means preventing said first actuation means from substantially operating until the inertia of the driving force of said drive means which has driven said second actuation means extinguishes, even when said drive mean is changed over by the changeover means from driving of said second actuation means to driving of said first actuation means.

14. A camera according to claim 13, wherein said second actuation means includes focal length changeover means for changing over the focal length of a photographic optical system.

15. A camera according to claim 13, wherein said first actuation means includes transfer means for transferring the photosensitive material.

16. A camera according to claim 15, wherein said protection means includes moving means for moving the transfer member to a position where the photosensitive material can be transferred by the first actuation means when it is driven a predetermined amount by said drive means.

17. A camera according to claim 13, wherein said drive means includes an electric drive device.

18. A camera according to claim 13, wherein said changeover means includes an elastic member.

19. An operation device for a camera, comprising:
(A) first actuation menas for performing a first operation,
(B) second actuation means for performing a second operation different from the first operation,
(C) drive means for selectively driving one of the first and second actuation means when connected therewith,
(D) manually operable changeover means for changing over a connection of said drive means from with said first actuation means to with said second actuation means,
(E) return means for normally connecting said drive means to said first actuation means and automatically returning said drive means which is connected to said second returning means by said changeover means to a state connected with said first actuation means; and
(F) protection means for preventing said first actuation mens from being substantially operated by the inertia of the drive force of the drive means which has driven the second actuation means when the connection of the drive means is returned by the return means from said second actuation means to said first actuation means, said protection means permitting said first actuation means to start the substantial operation after said first actuation means is driven a predetermined amount by said drive means.

20. A device according to claim 19, wherein said second atuation means includes focal length changeover means for changing over the focal length of a photographic optical system.

21. A device according to claim 19, wherein said first actaution menas includes a film transferring member.

22. A device according to claim 19, wherein said drive means includes an electric drive device.

23. A device according to claim 19, wherein said return means includes an elastic member.

24. An operation device for a camera, comprising:
(A) first actuation means for performing a first operation,
(B) second actuation means for performing a second operation different from the first operation,
(C) drive means for selectively driving one of said first and second actuation mens when connected therewith,
(D) operation means for connecting said drive means connected with said first actuation means to said second actuation means,
(E) return means for automatically returning said drive means to a state connected to said first actuation means after it has transmitted a drive force to said second actuation means; and
(F) protection means for protecting said first actuation means from thed influence of inertia of the drive force transmitted to said second actuation means when said drive means is returned to a state connected to said first actuation means, said protection means preventing said first actuation means from substantially operating until the inertia of the drive force of said drive means transmitted to said second actuation means extinguishes even when the drive means is returned by the return means.

25. A device according to claim 24, wherein said second actuation means includes focal length changeover means for changing over the focal length of a photographic optical system.

26. A device according to claim 24, wherein said first actuation means includes transfer means for transferring the photosensitive material.

27. A device according to claim 24, wherein said drive means includes an electric drive device.

28. A device according to claim 24, wherein said return means includes an elastic member.

29. An operation device for a camera, comprising:
(A) first actuation means for performing a first operation,
(B) second actuation means for performing a second operation different from the first operation,
(C) drive means for driving one of said first and second actuation means,
(D) changeover means for changing over said drive means automatically from driving said second actuation means to driving said first actuation means,
(E) protection means for protecting said first actuation means from adverse effect by the inertia of the drive force of said drive means which has driven said second actuation means when said drive means is changed over by the changeover means from a state of driving said second actuation means to a state of driving said first actuation means, said protection means preventing said first actuation means from substantially operating until the ienrtia of the driving force of said drive means which has driven said second actuation means extinguishes, even when said drive means is changed over by the changeover means from driving of said second actuation means to driving of said first actuation means.

30. A device according to claim 29, wherein said second actuation means includes focal length changeover means for changing over the focal length of a photographic optical system.

31. A device according to claim 29, wherein said first actuation means includes transfer means for transferring the photosensitive material.

32. A device according to claim 29, wherein sid drive means includes an electric drive device.

33. A device according to claim 29, wherein said changeover means includes an elastic member.

* * * * *